United States Patent
Seo et al.

(10) Patent No.: US 8,055,117 B2
(45) Date of Patent: **\*Nov. 8, 2011**

(54) RECORDING MEDIUM HAVING DATA STRUCTURE FOR MANAGING REPRODUCTION DURATION OF STILL PICTURES RECORDED THEREON AND RECORDING AND REPRODUCING METHODS AND APPARATUSES

(75) Inventors: Kang Soo Seo, Kyunggi-do (KR); Byung Jin Kim, Kyunggi-do (KR)

(73) Assignee: LG Electronics Inc., Seoul (KR)

(*) Notice: Subject to any disclaimer, the term of this patent is extended or adjusted under 35 U.S.C. 154(b) by 840 days.

This patent is subject to a terminal disclaimer.

(21) Appl. No.: 10/766,239

(22) Filed: Jan. 29, 2004

(65) Prior Publication Data

US 2004/0213093 A1    Oct. 28, 2004

(30) Foreign Application Priority Data

Feb. 15, 2003    (KR) .................... 10-2003-0009642

(51) Int. Cl.
*H04N 9/80* (2006.01)
(52) U.S. Cl. ....................... 386/241; 386/248
(58) Field of Classification Search .................. None
See application file for complete search history.

(56) References Cited

U.S. PATENT DOCUMENTS

| | | | |
|---|---|---|---|
| 5,854,873 A | 12/1998 | Mori et al. | |
| 5,870,523 A | 2/1999 | Kikuchi et al. | |
| 5,884,004 A | 3/1999 | Sato et al. | |
| 5,999,698 A | 12/1999 | Nakai et al. | |
| 6,122,436 A | 9/2000 | Okada et al. | |
| 6,157,769 A | 12/2000 | Yoshimura et al. | |
| 6,250,928 B1 | 6/2001 | Poggio et al. | |
| 6,266,483 B1 | 7/2001 | Okada et al. | |
| 6,285,826 B1 | 9/2001 | Murase et al. | |
| 6,308,005 B1 | 10/2001 | Ando et al. | |
| 6,341,196 B1 | 1/2002 | Ando et al. | |
| 6,353,702 B1 | 3/2002 | Ando et al. | |
| 6,374,037 B1 | 4/2002 | Okada et al. | |
| 6,385,389 B1 | 5/2002 | Maruyama et al. | |

(Continued)

FOREIGN PATENT DOCUMENTS

AU    6672298    9/1998

(Continued)

OTHER PUBLICATIONS

International Search Report.

(Continued)

*Primary Examiner* — William Vaughn, Jr.
*Assistant Examiner* — Heather Jones
(74) *Attorney, Agent, or Firm* — Harness, Dickey & Pierce, P.L.C.

(57) ABSTRACT

The data structure includes a navigation area of the recording medium storing at least one playlist, a first entry point map and a second entry point map. The playlist includes at least one playitem and at least one sub-playitem. The playitem provides navigation information for reproducing at least one still picture from a first file, and the sub-playitem providing navigation information for reproducing audio data from a second file. The first entry point map includes at least one entry point pointing to the still picture, and the second entry point map includes at least one entry point pointing to the audio data.

38 Claims, 10 Drawing Sheets

U.S. PATENT DOCUMENTS

| | | |
|---|---|---|
| 6,393,430 B1 | 5/2002 | Van Ryzin |
| 6,400,893 B1 | 6/2002 | Murase et al. |
| 6,442,337 B1 | 8/2002 | Okada et al. |
| 6,470,460 B1 | 10/2002 | Kashiwagi et al. |
| 6,493,504 B1 | 12/2002 | Date et al. |
| 6,529,683 B2 * | 3/2003 | Mori et al. ............... 386/96 |
| 6,532,335 B2 | 3/2003 | Otomo et al. |
| 6,574,419 B1 | 6/2003 | Nonomura et al. |
| 6,580,870 B1 | 6/2003 | Kanazawa et al. |
| 6,594,442 B1 | 7/2003 | Kageyama et al. |
| 6,771,891 B1 * | 8/2004 | Moon ....................... 386/96 |
| 6,798,976 B2 | 9/2004 | Tsumagari et al. |
| 6,823,010 B1 | 11/2004 | Curet et al. |
| 6,829,211 B2 | 12/2004 | Sako et al. |
| 6,856,756 B1 | 2/2005 | Mochizuki et al. |
| 6,943,684 B2 | 9/2005 | Berry |
| 6,999,674 B1 | 2/2006 | Hamada et al. |
| 7,054,545 B2 * | 5/2006 | Ando et al. ............... 386/96 |
| 7,224,890 B2 | 5/2007 | Kato |
| 2001/0000809 A1 | 5/2001 | Ando et al. |
| 2001/0016112 A1 | 8/2001 | Heo et al. |
| 2001/0017975 A1 | 8/2001 | Ando et al. |
| 2001/0043790 A1 | 11/2001 | Sacki et al. |
| 2001/0046371 A1 | 11/2001 | Ando et al. |
| 2001/0056580 A1 | 12/2001 | Seo et al. |
| 2002/0006165 A1 | 1/2002 | Kato |
| 2002/0035575 A1 | 3/2002 | Taira et al. |
| 2002/0048228 A1 | 4/2002 | Sako et al. |
| 2002/0085022 A1 | 7/2002 | Masuda et al. |
| 2002/0126994 A1 | 9/2002 | Gunji et al. |
| 2002/0127001 A1 | 9/2002 | Gunji et al. |
| 2002/0130896 A1 | 9/2002 | Spence et al. |
| 2002/0135607 A1 | 9/2002 | Kato et al. |
| 2002/0135608 A1 | 9/2002 | Hamada et al. |
| 2002/0145702 A1 * | 10/2002 | Kato et al. ............... 352/1 |
| 2002/0164152 A1 | 11/2002 | Kato et al. |
| 2002/0172496 A1 | 11/2002 | Gunji et al. |
| 2003/0014760 A1 | 1/2003 | Yamauchi et al. |
| 2003/0165328 A1 | 9/2003 | Grecia |
| 2003/0235406 A1 | 12/2003 | Seo et al. |
| 2004/0001704 A1 | 1/2004 | Chan et al. |
| 2004/0057700 A1 | 3/2004 | Okada et al. |
| 2004/0081434 A1 * | 4/2004 | Jung et al. ............... 386/95 |
| 2004/0141436 A1 | 7/2004 | Monahan |
| 2004/0179820 A1 | 9/2004 | Kashiwagi et al. |
| 2004/0184780 A1 | 9/2004 | Seo et al. |
| 2004/0213552 A1 | 10/2004 | Kato |
| 2005/0019007 A1 | 1/2005 | Kato et al. |
| 2005/0105888 A1 | 5/2005 | Hamada et al. |
| 2005/0163463 A1 | 7/2005 | Schick et al. |
| 2005/0196143 A1 | 9/2005 | Kato et al. |
| 2005/0201718 A1 | 9/2005 | Kato |
| 2005/0254363 A1 | 11/2005 | Hamada et al. |
| 2006/0036960 A1 | 2/2006 | Loui |
| 2006/0188223 A1 * | 8/2006 | Ikeda et al. ............... 386/95 |
| 2006/0195633 A1 | 8/2006 | Plourde, Jr. |

FOREIGN PATENT DOCUMENTS

| | | |
|---|---|---|
| AU | 2003/282415 | 6/2004 |
| CN | 1063863 | 4/1996 |
| CN | 1205503 | 1/1999 |
| CN | 1240293 | 1/2000 |
| CN | 1263672 | 8/2000 |
| CN | 1301445 A | 6/2001 |
| CN | 1303094 | 7/2001 |
| CN | 1304533 | 7/2001 |
| CN | 1357888 A | 7/2002 |
| CN | 1381137 | 11/2002 |
| DE | 69907758 | 2/2004 |
| DE | 60002774 | 3/2004 |
| EP | 0856849 | 8/1998 |
| EP | 0978994 | 2/2000 |
| EP | 1045393 | 10/2000 |
| EP | 0949825 | 11/2000 |
| EP | 1 103 974 | 5/2001 |
| EP | 1113439 | 7/2001 |
| EP | 1 128 386 | 8/2001 |
| EP | 0942609 | 10/2001 |
| EP | 1 198 133 A1 | 4/2002 |
| EP | 1300851 | 4/2003 |
| EP | 1041566 | 5/2003 |
| EP | 1204269 | 11/2003 |
| FR | 2581771 | 11/1986 |
| GB | 2119151 | 11/1983 |
| JP | 1-300777 | 12/1989 |
| JP | 06-311481 | 11/1994 |
| JP | 07-057436 | 3/1995 |
| JP | 07-262646 | 10/1995 |
| JP | 1997-017101 | 1/1997 |
| JP | 10-154373 | 6/1998 |
| JP | 2000-004421 | 1/2000 |
| JP | 2000-020554 | 1/2000 |
| JP | 2000-041212 | 2/2000 |
| JP | 2000-059714 | 2/2000 |
| JP | 2000-333126 | 11/2000 |
| JP | 2001-052467 | 2/2001 |
| JP | 2001-069460 | 3/2001 |
| JP | 2001-078123 | 3/2001 |
| JP | 2001-86458 | 3/2001 |
| JP | 2001-103417 | 4/2001 |
| JP | 2001-157155 | 6/2001 |
| JP | 2001-167529 | 6/2001 |
| JP | 2001-1155466 | 6/2001 |
| JP | 2001-216739 | 8/2001 |
| JP | 2001-231015 | 8/2001 |
| JP | 2001-285772 | 10/2001 |
| JP | 2002-082684 | 3/2002 |
| JP | 2002-158972 | 5/2002 |
| JP | 2002-208258 | 7/2002 |
| JP | 2002-325221 | 11/2002 |
| JP | 2002-354424 | 12/2002 |
| JP | 2003-006979 | 1/2003 |
| JP | 2003-016764 | 1/2003 |
| JP | 2003-045154 | 2/2003 |
| JP | 2003-299015 | 10/2003 |
| JP | 2004-336566 | 11/2004 |
| KR | 1998-0086030 | 12/1998 |
| KR | 1999-0070106 | 9/1999 |
| KR | 10-2000-0002840 | 1/2000 |
| KR | 10-2000-0002921 | 1/2000 |
| KR | 10-2000-0002922 | 1/2000 |
| KR | 10-2000-0014419 | 3/2000 |
| KR | 10-2000-0018987 | 4/2000 |
| KR | 10-2001-0013565 | 2/2001 |
| KR | 10-2001-0021485 | 3/2001 |
| KR | 10-2001-0027114 | 4/2001 |
| KR | 10-2001-0051295 | 6/2001 |
| KR | 10-2001-0066211 | 7/2001 |
| KR | 10-2002-0021402 | 3/2002 |
| KR | 10-2002-0064463 | 8/2002 |
| KR | 10-2003-0064546 | 8/2003 |
| TW | 517495 | 1/2003 |
| WO | WO 98/37699 | 8/1998 |
| WO | WO 99/53694 | 10/1999 |
| WO | WO 00/33532 | 6/2000 |
| WO | WO 00/55857 | 9/2000 |
| WO | WO 00/60598 | 10/2000 |
| WO | WO 01/82608 | 11/2001 |
| WO | WO 0182608 | 11/2001 |
| WO | WO 02/062061 | 8/2002 |
| WO | WO 2004/023234 | 3/2004 |
| WO | WO 2004/023484 | 3/2004 |
| WO | WO 2004/023485 | 3/2004 |
| WO | WO 2004/066281 A1 | 8/2004 |
| WO | WO 2004/075194 A1 | 9/2004 |
| WO | WO 2004/086396 A1 | 10/2004 |

OTHER PUBLICATIONS

European Telecommunications Standards Institute, "*Digital Video Broadcasting (DVB); Subtitling systems*", 1997, pp. 1-45.

Japanese Office Action dated May 20, 2008.

Search Report for corresponding European application dated May 16, 2008.

Office Action for corresponding Japanese application dated May 20, 2008.

Japanese Office Action dated Sep. 24, 2008 citing JP 2001-285772 (shown above).
European Search Report dated Jul. 30, 2008 citing enclosed references.
(ISO) International Organization for Standardization and (IEC) International Electrotechnical Commission, "Information Technology—Generic Coding of Moving Pictures and Associated Audio Information: Systems," second edition Dec. 1, 2000.
Chinese Office Action dated Aug. 8, 2008.
Japanese Office Action dated Sep. 16, 2008.
Office Action for U.S. Appl. No. 10/759,461 dated Jan. 29, 2010.
Office Action for Japanese patent application No. 2008-318105 dated Feb. 16, 2010.
Office Action for corresponding Korean Application No. 10-2005-7013392 dated May 17, 2010.
Office Action by the USPTO dated Jul. 2, 2010 for U.S. Appl. No. 10/759,461.
Office Action by the Canadian Intellectual Property Office dated Oct. 1, 2010 for Application No. 2,512,844.
Canadian Office Action by the Canadian Intellectual Property Office dated Nov. 8, 2010, issued for Application No. 2 513 666.
Office Action dated Feb. 1, 2011 issued in corresponding U.S. Appl. No. 10/759,461.
Canadian Office Action dated Jul. 6. 2011 issued in corresponding Canadian Application No. 2513666.
Canadian Office Action dated Jun. 28, 2011 issued in corresponding CA Application No. 2.515.950.

* cited by examiner

US 8,055,117 B2

RECORDING MEDIUM HAVING DATA STRUCTURE FOR MANAGING REPRODUCTION DURATION OF STILL PICTURES RECORDED THEREON AND RECORDING AND REPRODUCING METHODS AND APPARATUSES

FOREIGN PRIORITY

The present invention claims priority under 35 U.S.C. 119 on Korean Application No. 10-2003-009642 filed Feb. 15, 2003; the contents of which are incorporated by reference in their entirety.

BACKGROUND OF THE INVENTION

1. Field of the Invention

The present invention relates to a recording medium having a data structure for managing reproduction of at least still pictures recorded thereon as well as methods and apparatuses for reproduction and recording.

2. Description of the Related Art

The standardization of new high-density read only and rewritable optical disks capable of recording large amounts of high-quality video and audio data has been progressing rapidly and new optical disk related products are expected to be commercially available in the near future. The Blu-ray Disc Rewritable (BD-RE) and Blu-ray Disk ROM (BD-ROM) are examples of these new optical disks.

While the standard for BD-RE has been published, the standardization for high-density read-only optical disks such as the Blu-ray ROM (BD-ROM) is still under way. Consequently, an effective data structure for managing reproduction of still pictures recorded on the high-density read-only optical disk such as a BD-ROM is not yet available.

SUMMARY OF THE INVENTION

The recording medium according to the present invention includes a data structure for managing reproduction of at least still pictures recorded on the recording medium.

In one exemplary embodiment, a navigation area of the recording medium stores at least one playlist and separate entry point maps for still picture data and audio data. The playlist includes at least one playitem and at least one sub-playitem. The playitem provides navigation information for reproducing at least one still picture from a first file, and the sub-playitem provides navigation information for reproducing audio data from a second file. A first entry point map in the navigation area includes at least one entry point pointing to the still picture, and a second entry point map in the navigation area includes at least one entry point pointing to the audio data.

In an exemplary embodiment, the playitem provides navigation information for reproducing a plurality of still pictures, and the first entry point map includes an entry point, associated with each still picture, that points to the associated still picture.

Similarly, in an exemplary embodiment, the second entry point map includes a plurality of entry points, and each entry point points to a point in the audio data.

In another exemplary embodiment, a data area of the recording medium stores a first clip file including the plurality of still pictures, and stores a second clip file including the audio data.

In another exemplary embodiment, a navigation area stores at least one playlist, a first entry point map and a second entry point map. The playlist includes at least one playitem and at least one sub-playitem. The playitem provides navigation information for reproducing at least one still picture from a first data stream, and the sub-playitem provides navigation information for reproducing an audio stream from a second data stream separate from the first data stream. The first entry point map includes at least one entry point pointing to the still picture, and the second entry point map includes at least one entry point pointing to the audio stream.

The present invention further provides apparatuses and methods for recording and reproducing the data structure according to the present invention, and recording and reproducing slide shows according to the present invention.

BRIEF DESCRIPTION OF THE DRAWINGS

The above features and other advantages of the present invention will be more clearly understood from the following detailed description taken in conjunction with the accompanying drawings, in which.

DESCRIPTION OF THE EMBODIMENTS

In order that the invention may be fully understood, exemplary embodiments thereof will now be described with reference to the accompanying drawings.

Figure 1:
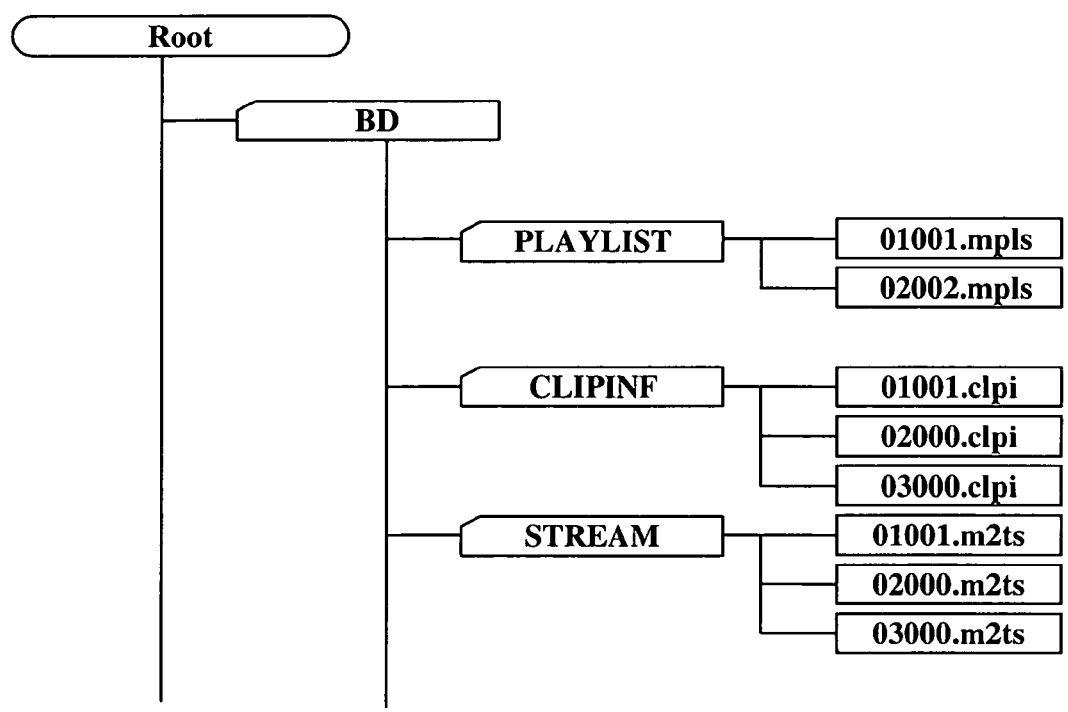
FIG. 1 illustrates an exemplary embodiment of a recording medium file or data structure according to the present invention.

A high-density recording medium such as a high density optical disk, for example, a Blu-Ray ROM (BD-ROM), BD-RE, etc. in accordance with the invention may have a file or data structure for managing reproduction of video and audio data as shown in FIG. 1. Some aspects of the data structure according to the present invention shown in FIG. 1 are the same as the well-known BD-RE standard, as such these aspects will be reviewed, but not described in great detail.

As shown in FIG. 1, the root directory contains at least one BD directory. The BD directory includes general files (not shown), a PLAYLIST directory in which playlist files (e.g., *.mpls) are stored, a CLIPINF directory in which clip information files (*.clpi) are stored, and a STREAM directory in which MPEG2-formatted A/V stream clip files (*.m2ts), corresponding to the clip information files, are stored.

The STREAM directory includes MPEG2-formatted A/V stream files called clip streams files or just clip files. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number). The presentation time stamp (PTS) and the source packet number (SPN) are related to an entry point in the AV stream; namely, the PTS and its related SPN point to an entry point on the AV stream. The packet pointed to is often referred to as the entry point packet.

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip file (e.g., presentation time stamps on an ATC or STC basis). The playlist file may also include sub-playitems that also provide a pair of IN-point and OUT-point that point to positions on a time axis of a clip file. Expressed another way, the playlist file identifies playitems and sub-playitems, each playitem or sub-playitem points to a clip file or portion thereof and identifies the clip information file associated with the clip file. The clip information file is used, among other things, to map the playitems to the clip file of source packets. Playlists may also include playlist marks which point to specific places (e.g., a specific address) in a clip file The general information files (not shown) provide general information for managing the reproduction of the A/V streams recorded on the optical disk.

Figure 2:
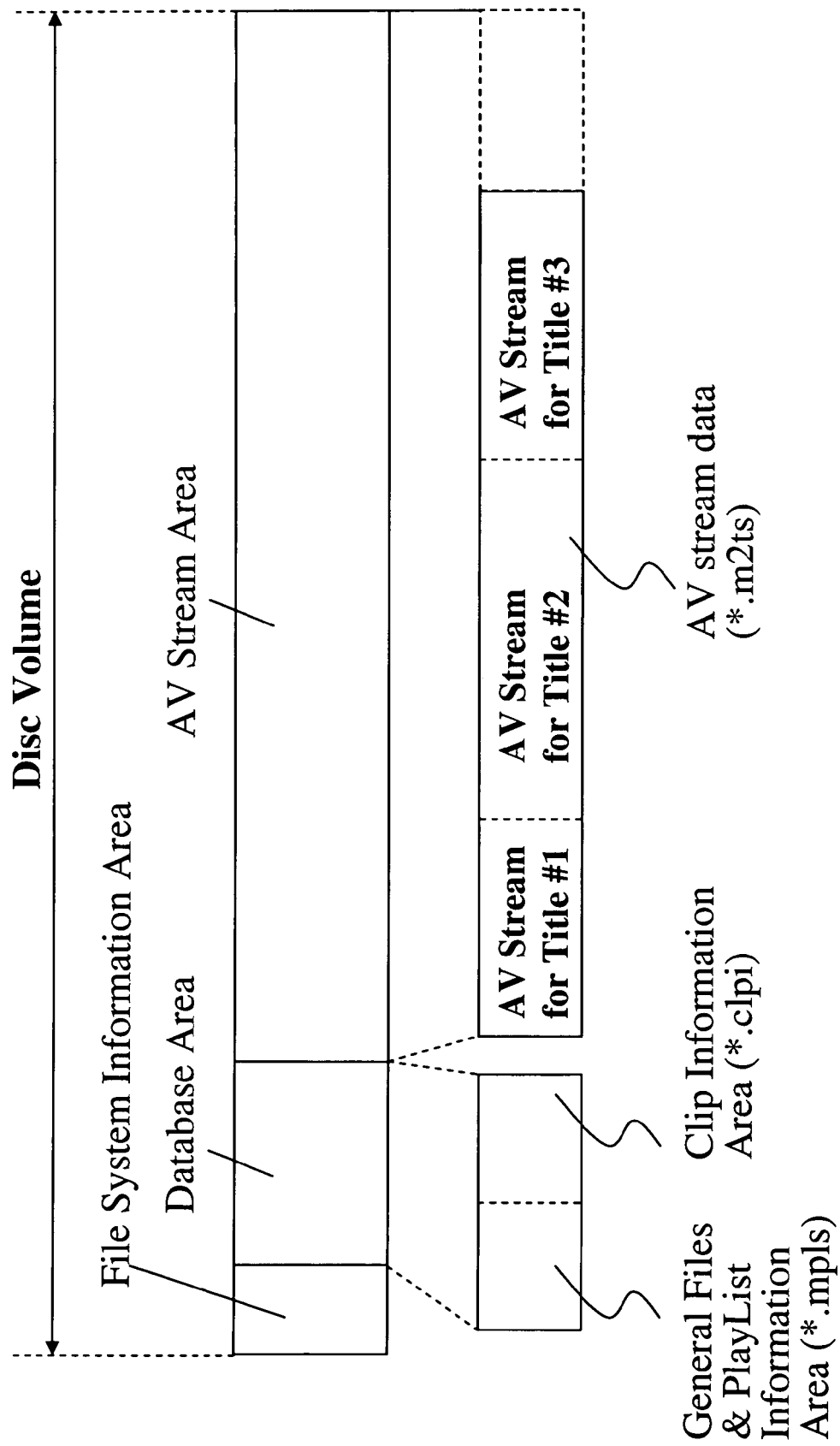
FIG. 2 illustrates an example of a recording medium having the data structure of FIG. 1 stored thereon.

In addition to illustrating the data structure of the recording medium according to an embodiment of the present invention, FIG. 1 represents the areas of the recording medium. For example, the general information files are recorded in one or more general information areas, the playlist directory is recorded in one or more playlist directory areas, each playlist in a playlist directory is recorded in one or more playlist areas of the recording medium, etc. FIG. 2 illustrates an example of a recording medium having the data structure of FIG. 1 stored thereon. As shown, the recording medium includes a file system information area, a data base area and an A/V stream area. The data base area includes a general information file and playlist information area and a clip information area. The general information file and playlist information area have the general information files recorded in a general information file area thereof, and the PLAYLIST directory and playlist files recorded in a playlist information area thereof. The clip information area has the CLIPINFO directory and associated clip information files recorded therein. The A/V stream area has the A/V streams for the various titles recorded therein.

Video and audio data are typically organized as individual titles; for example, different movies represented by the video and audio data are organized as different titles. Furthermore, a title may be organized into individual chapters in much the same way a book is often organized into chapters.

Because of the large storage capacity of the newer, high-density recording media such as BD-ROM and BD-RE optical disks, different titles, various versions of a title or portions of a title may be recorded, and therefore, reproduced from the recording media. For example, video data representing different camera angles may be recorded on the recording medium. As another example, versions of title or portions thereof associated with different languages may be recorded on the recording medium. As a still further example, a director's version and a theatrical version of a title may be recorded on the recording medium. Or, an adult version, young adult version and young child version (i.e., different parental control versions) of a title or portions of a title may be recorded on the recording medium. Each version, camera angle, etc. represents a different reproduction path, and the video data in these instances is referred to as multiple reproduction path video data.

Because of the large storage capacity of the newer, high-density recording media such as BD-ROM still images or pictures may be recorded and reproduced in an organized and/or user interactive fashion, for example, as slideshows. The data structure for managing reproduction of still pictures for a high-density recording medium in accordance with embodiments of the present invention will be described along with methods and apparatuses according to embodiments of the present invention for recording and reproducing still images.

Figure 3:
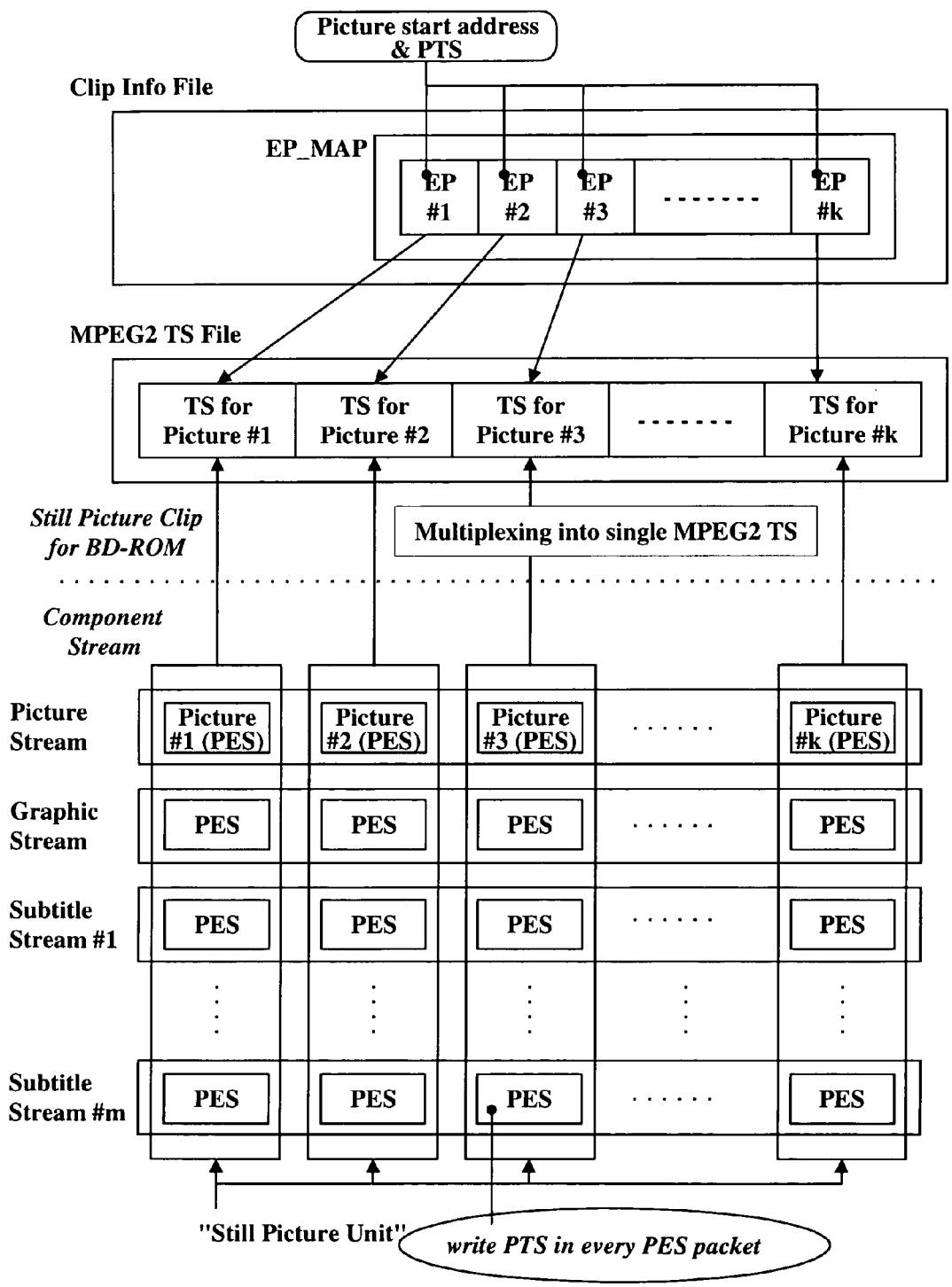
FIG. 3 illustrates a detailed embodiment of portions of the data structure in FIG. 1 and a method for managing still images of a high-density recording medium according to the present invention.

FIG. 3 illustrates an embodiment of a data structure and method for managing still images of a high-density recording medium such as a BD-ROM. As shown in FIG. 3, a still picture stream and related data streams (e.g., the graphic & subtitle streams) are packetized into PES packets on a still image basis. Namely, each elementary stream is packetized into PES packets. A PES packet of the still picture stream includes a single still picture, and the associated PES packets of the related data include the related data associated with the still picture (e.g., for reproduction in synchronization with the associated still picture). As further shown in FIG. 3, a presentation time stamp (PTS) is included in the header area of each PES packet. As discussed in detail below, the PTSs may be used to calculate presentation duration of a still picture and/or to link with a playlist. The still picture together with the related data to be reproduced in synchronization therewith are grouped into a still picture unit. On a still picture unit basis, the still picture stream and related data streams are multiplexed into a still picture file of MPEG2 transport streams.

FIG. 3 further shows a clip information file corresponding to the still picture file. The clip information file includes an entry point map (EP_MAP). Individual entry points (EP #1-#k) in the EP map contain respective navigation information for accessing a head recording position of a corresponding still picture unit. The navigation information, for example, includes source packet number entry point start (SPN_EP_Start) information indicating the start recording position of the corresponding still picture unit and also includes a PTS of the still picture unit. As discussed in detail below, the PTSs may be used to calculate presentation duration of each still picture.

Figure 4:
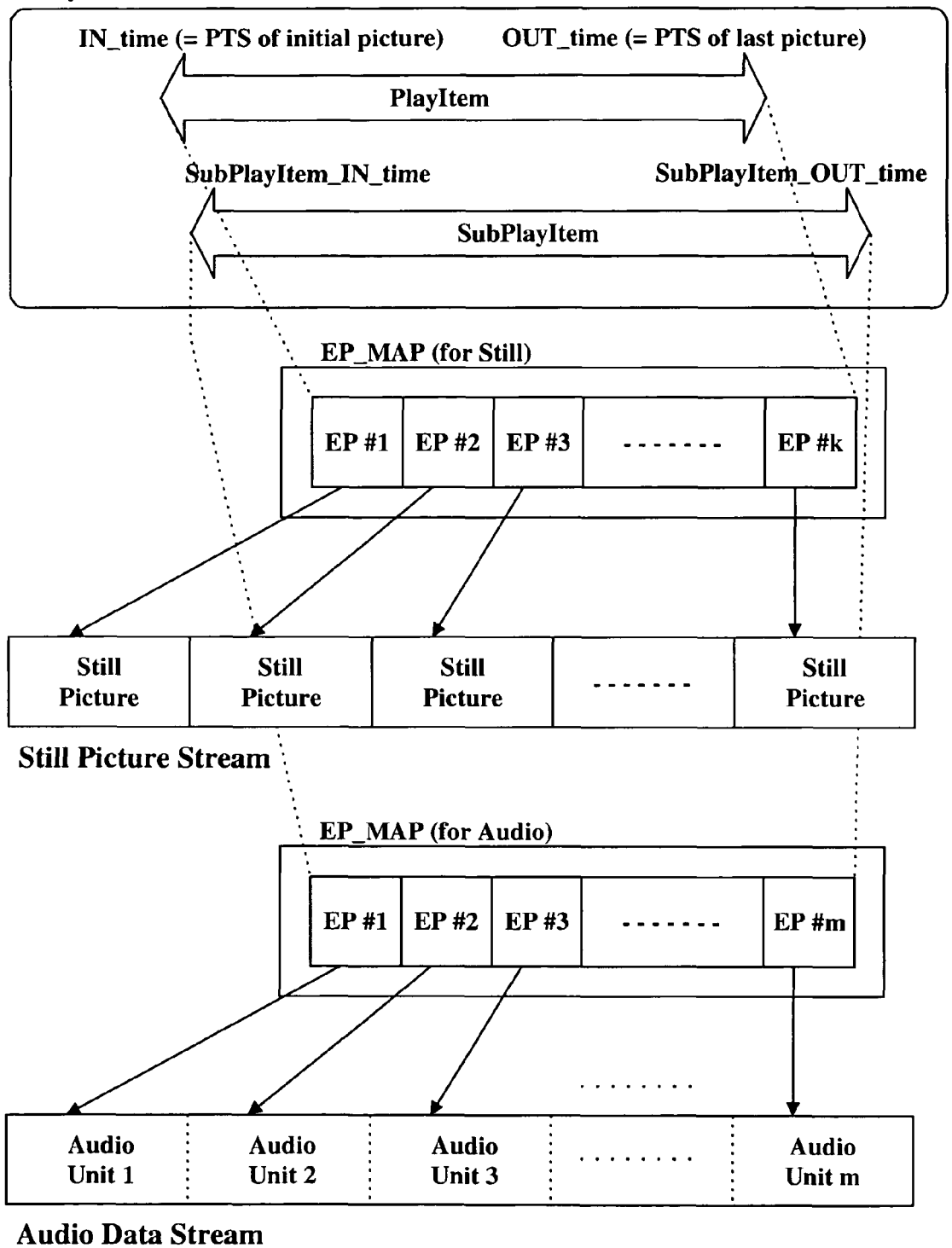
FIG. 4 illustrates a detailed embodiment of portions of the data structure in FIG. 1 and a method for managing still images of a high-density recording medium according to the present invention.

FIG. 4 illustrates another embodiment of a playlist and entry point map data structure for play control of the still picture file discussed above with respect to FIG. 3. As shown, a playitem (PlayItem) in the playlist contains in-time (IN_time) information and out-time (OUT_time) information corresponding respectively to the start position and end position of the still images in the still picture file to reproduce. As shown, the PTSs provided as the in-time information and out-time information by the playitem, link the playitem to a still picture entry point map of the clip information file associated with the still picture stream. The in-time PTS is the PTS of the initial picture to be reproduced, which in this example corresponds to the still picture referenced by the first entry point EP #1 in the still picture entry point map, and the out-time PTS is the PTS of the last still picture to be reproduced, which in this example corresponds to the still picture referenced by the kth entry point EP #k in the still picture entry point map.

A sub-playitem (SubPlayItem) in the playlist contains sub-playitem in-time (SubPlayItem_IN_time) information and sub-playitem out-time (SubPlayItem_OUT_time) information for a separate audio file to be reproduced in association with the still picture file. The audio data may be reproduced in either a synchronized or unsynchronized fashion with the associated still images.

A clip information file corresponding to the audio file records an entry point map (EP_MAP) for the audio stream. Individual entry points of the audio entry point map are associated with respective audio units of the audio data stream, each of which is formed by grouping a fixed number of audio frames recorded in the audio file.

Figure 5:
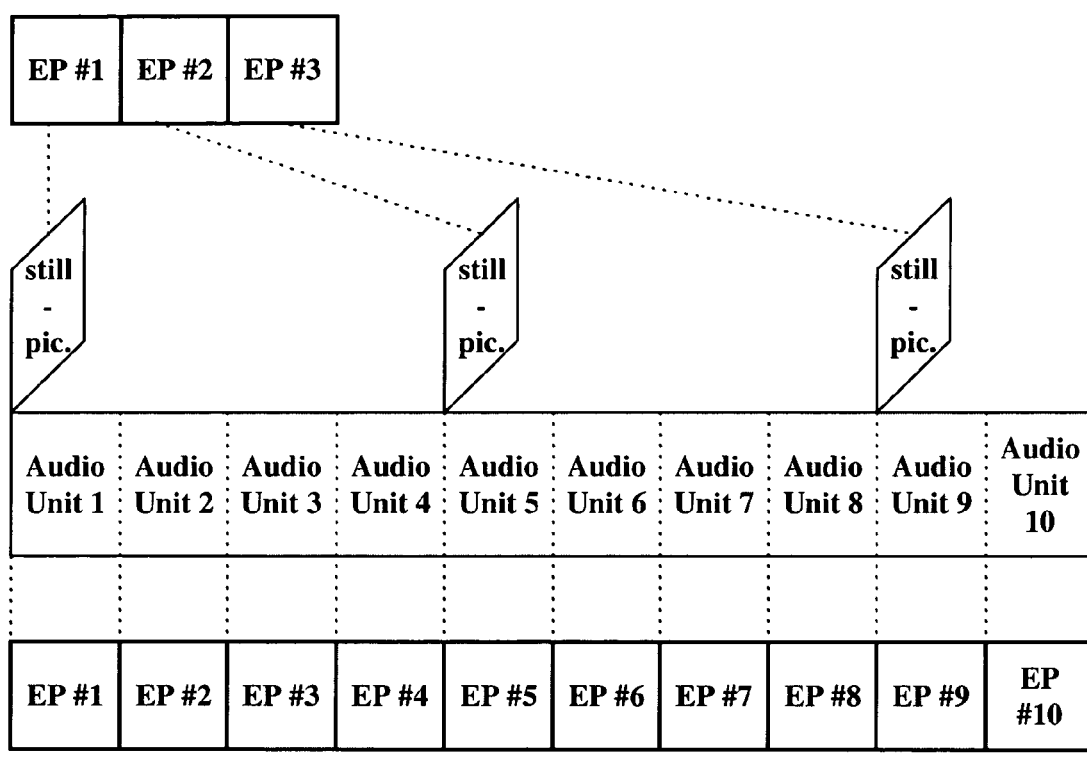
FIG. 5 illustrates an example of reproducing still pictures and audio data units using the data structure of FIG. 4.

As FIG. 5 illustrates, during reproduction, a reproducing apparatus makes reference to the entry point map (EP_MAP for Still) for still pictures associated with a playitem included in the playlist, and reads out the corresponding still pictures and related data. At the same time, by making reference to the entry point map (EP_MAP for Audio) for audio data associated with a sub-playitem (SubPlayItem) included in the playlist, the reproducing apparatus reproduces audio data. In this manner, the audio data and still picture data may be reproduced in association with each other such as for a slideshow.

In reproducing a still picture, the reproducing apparatus calculates the difference between the PTSs recorded in an entry point associated with the still picture and the next entry point or a PES of the still picture and the next PES, and determines the presentation duration for the still picture based on the determined difference. A difference of zero indicates an infinite display duration in which the still picture is displayed until user input to the contrary (e.g., such as to display a next picture) is received. A positive difference indicates a finite display duration equal to or proportional to the determined difference. The corresponding still picture is then continuously reproduced for the determined finite presentation duration or until the key input of the user is received.

By making reference to entry points included in the entry point map of the audio data, the reproducing apparatus reproduces the data of an audio unit corresponding to the still picture. While the same still picture is reproduced continuously, a plurality of audio units may be reproduced successively, such as shown in FIG. 5. As will be appreciated, the audio data may be linked or synchronized with the still pictures. In this case, the audio entry point map includes entry points that each have a PTS for the associated audio unit of data that relates to the PTS of the related still picture. In unsynchronized reproduction, the audio data is reproduced independently of the still pictures.

The PTSs of the audio and still picture data in the respective entry point maps are particularly useful when a user conducts a search operation during reproduction of synchronized still picture and audio data. When a user makes a search request during reproduction, the reproducing apparatus may make reference to the PTS values recorded in the respective entry points for the audio data units, thereby searching for an audio entry point which corresponds to the user-requested reproduction position or an arbitrary audio entry point that is closest to the user-requested reproduction position.

For example, during reproduction of a sixth audio entry point as shown in FIG. 5, a user may request reproduction of audio 20 seconds before the current reproduction position. In this case, assume a third audio entry point has a presentation position, as determined from the PTSs of the audio data units in the audio entry point map, that amounts to 20 seconds ago as measured from the current reproduction position. Here, the reproducing apparatus uses the PTSs in the audio entry point map to select the third audio entry point in response to the user request. Also, the reproducing apparatus uses the PTSs of the still pictures provided by the still picture entry point map to search for an entry point of a still picture linked to the third audio entry point. In the example of FIG. 5, this search results in locating the first entry point EP #1 of the still picture entry point map and determining to reproduce the first still picture corresponding thereto along with the audio unit corresponding to the third audio entry point.

Accordingly, the data structure of the recording medium according to this embodiment of the present invention provides for searching and reproducing audio data corresponding to a user-requested time with reference to the audio entry map, and simultaneously reproducing a still picture in association with the audio data.

Figure 6:
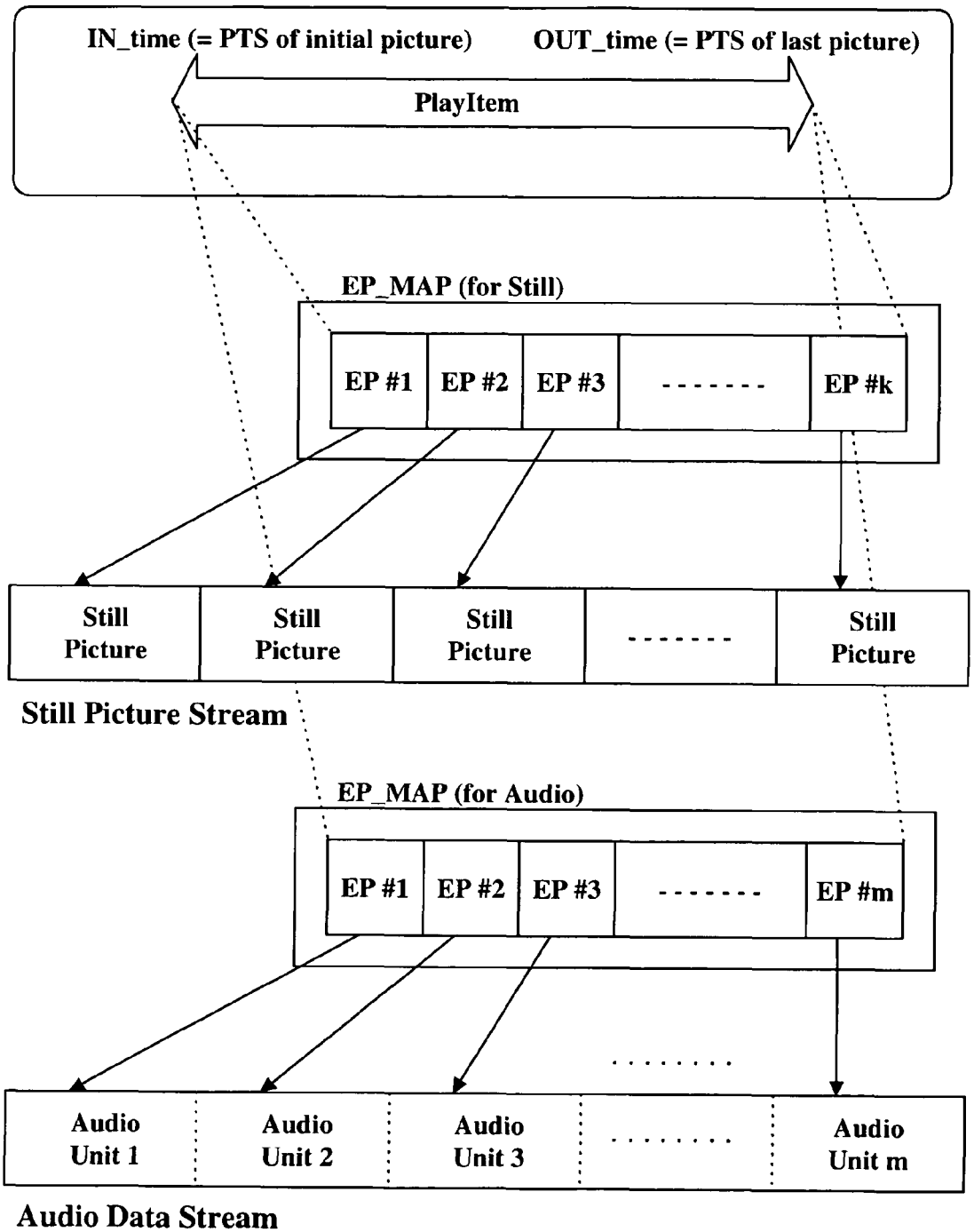
FIG. 6 illustrates a further detailed embodiment of portions of the data structure in FIG. 1 and a method for managing still images of a high-density recording medium according to the present invention.

FIG. 6 illustrates another embodiment of a playlist and playitem according to the present invention. As shown, a playitem included in the playlist may be linked to both the entry point map for reproducing still picture data (EP_MAP for Still) and the entry point map for reproducing audio data (EP_MAP for Audio). Also, while not shown in FIG. 6, the still picture data and audio data may be multiplexed into a single file.

Figure 7:
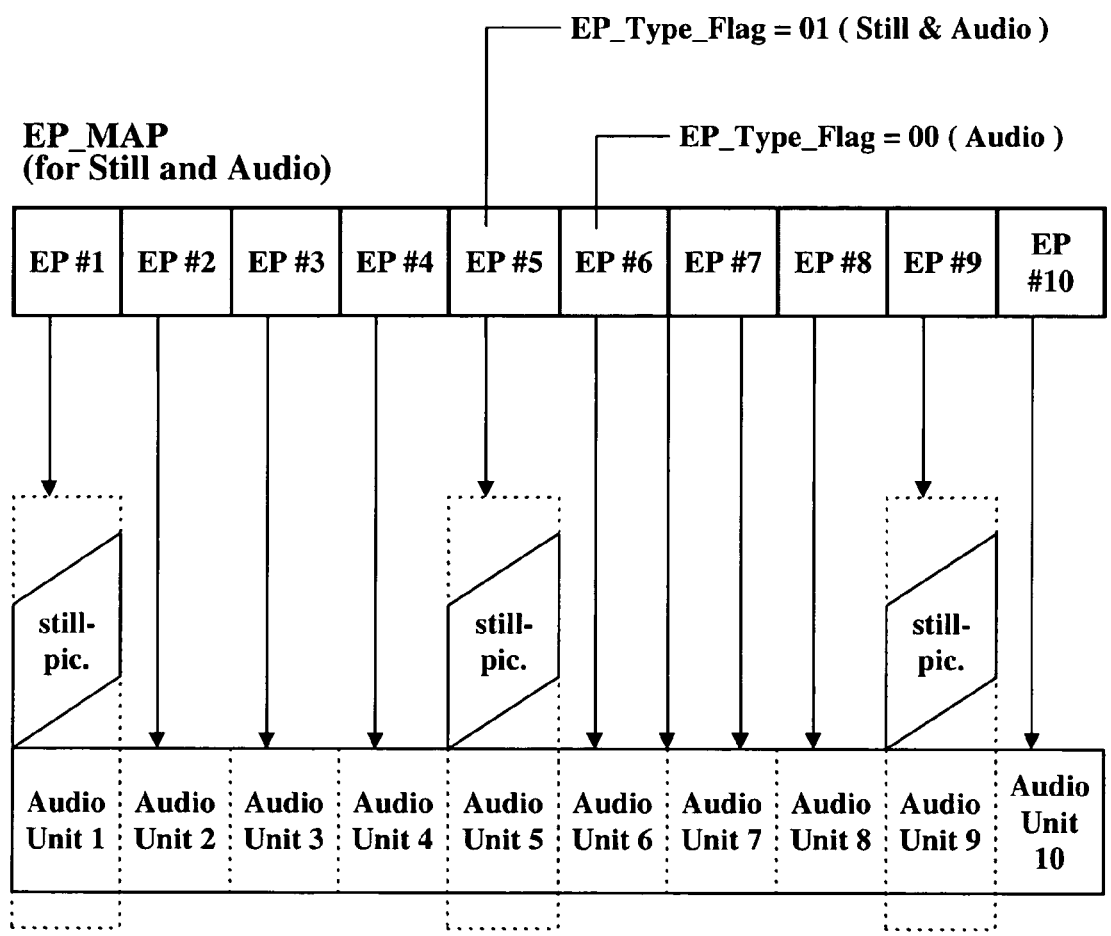
FIG. 7 illustrates another embodiment of an entry point map according to the present invention.

FIG. 7 illustrates another embodiment of an entry point map according to the present invention. As shown, the audio entry point map may be unified into the still picture entry map and thus the audio and still picture data may be managed as a single entry point map. In this embodiment, the entry points include a type flag EP_Type_Flag. For an entry point where still pictures and audio units are linked (e.g., for simultaneous reproduction), the corresponding entry point type flag is set to '1' indicating that the corresponding entry point links both a still picture and audio. For an entry point linked only to an audio unit, the entry point type flag is set to '0'.

Figure 8:
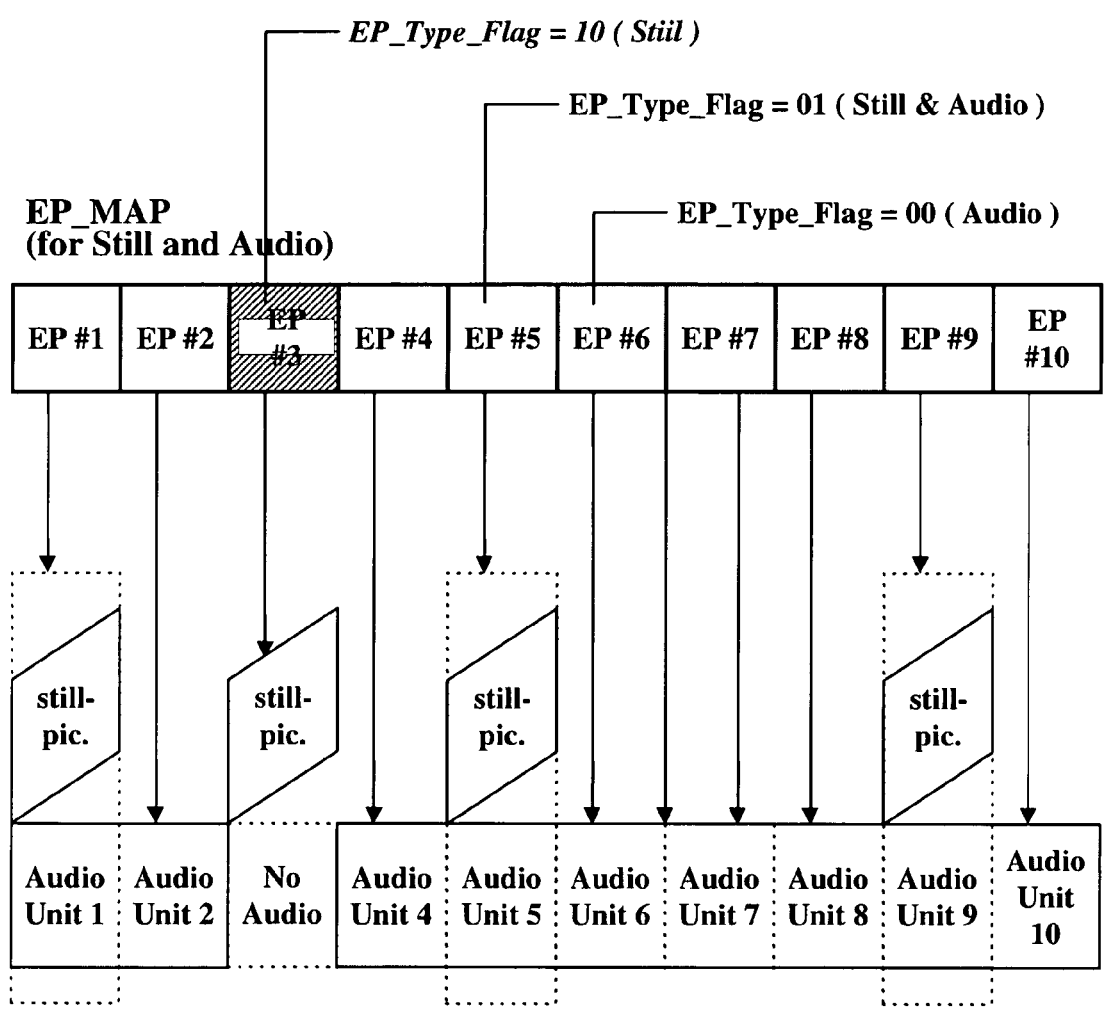
FIG. 8 illustrates yet another embodiment of an entry point map according to the present invention.

FIG. 8 illustrates yet another embodiment of an entry point map according to the present invention. As shown, the entry point type flag may be extended for the case when an entry point is linked to only a still picture. For example, when the entry point type flag is '00', the corresponding entry point is linked only to audio data. When the entry point type is '01', the corresponding entry point is linked to both a still picture and audio data. And, when the entry point type is '10', the corresponding entry point is linked to only a still picture.

Accordingly, a reproducing apparatus, by making reference to entry points and the respective entry point type information in a single entry point map, may search for audio and a still picture corresponding to the playback time requested by the user and reproduce the corresponding audio and still picture in association with each other.

Figure 9:
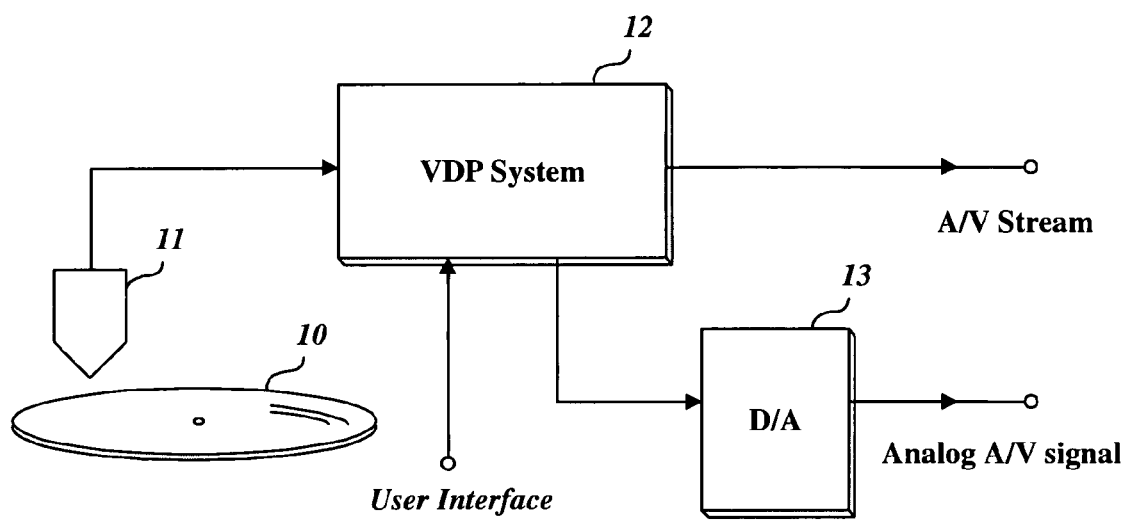
FIG. 9 illustrates a schematic diagram of a partial structure of an optical disc reproducing apparatus where the present invention is applied.

FIG. 9 illustrates a schematic diagram of a partial structure of an optical disc apparatus where the present invention may be applied. As shown, the optical disc apparatus includes an optical pickup 11 for reproducing data from the an optical disk. A VDP (Video Disc Play) system 12 controls the reproduction operation of the optical pickup 11 and demodulates the data reproduced by the optical pickup 11. The VDP 12 produces an AV stream, which may also be fed to a D/A converter 13 to generate an analog version of the AV stream.

The VDP system 12 controls the optical pickup 11 and demodulates the reproduced data based on user input received from a user interface and the navigation and management information recorded on the optical disk in accordance with the present invention. For example, the VDP system 12 makes reference to a playlist and an entry point map included in a clip information file as described above to reproduce still pictures and/or audio data.

Figure 10:
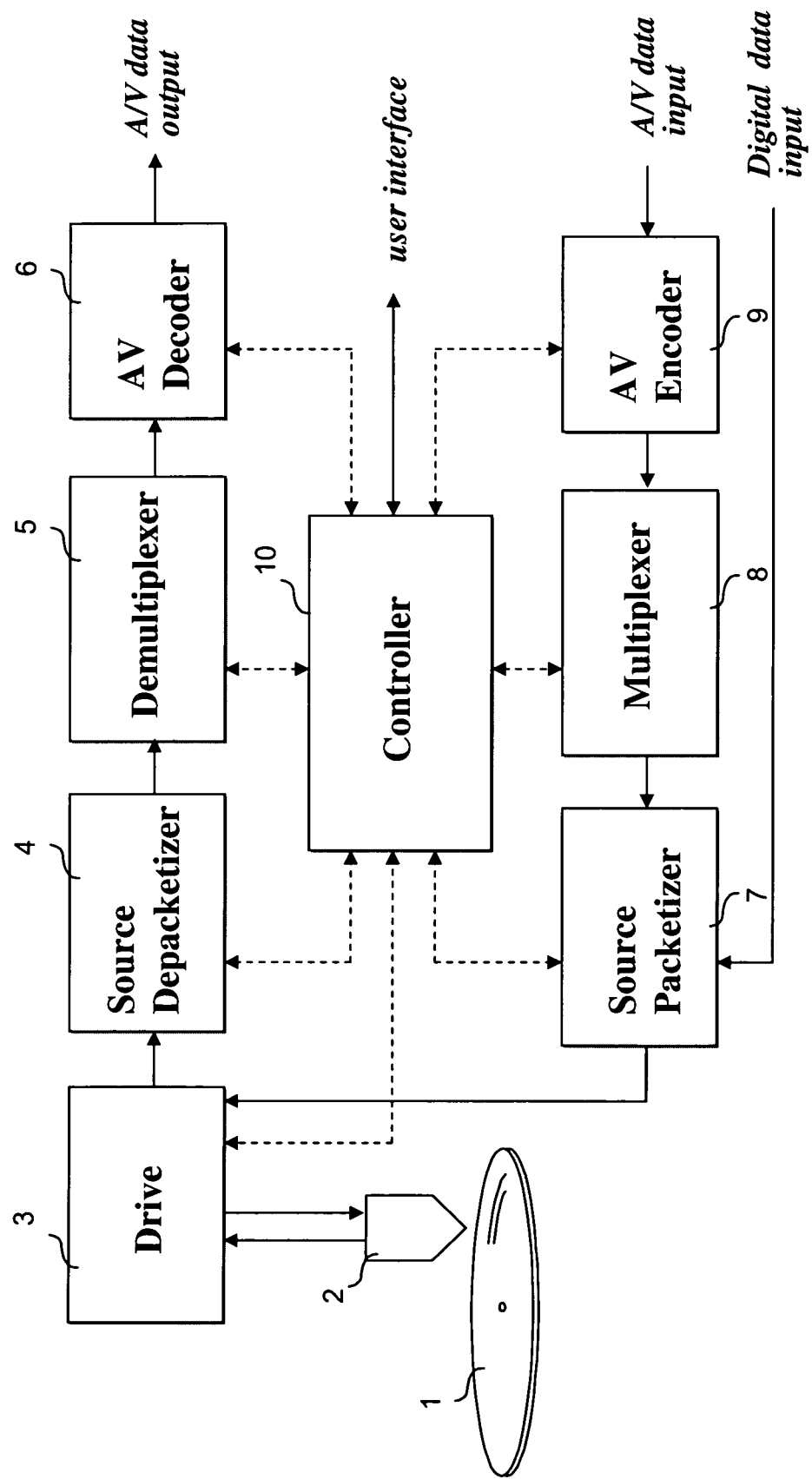
FIG. 10 illustrates an embodiment of a recording and reproducing apparatus according to the present invention.

FIG. 10 illustrates a schematic diagram of an embodiment of an optical disk recording and reproducing apparatus according to the present invention. As shown, an AV encoder 9 receives and encodes data (e.g., still image data, audio data, etc.). The AV encoder 9 outputs the encoded data along with coding information and stream attribute information. A multiplexer 8 multiplexes the encoded data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 10, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the data being recorded on the optical disk. For example, based on information received via the user interface (e.g., instruction set saved on disk, provided over an intranet or internet by a computer system, etc.) the controller 10 controls the drive 3 to record one or more of the data structures of FIGS. 1-8 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the data from the optical disk. For example, as discussed above with respect to the embodiments of the present invention, a still image or still images may be reproduced in association with audio data based on the navigation information. Furthermore, an image or group of images may be reproduced as a slideshow or portion of a slideshow. As also discussed, a slideshow may be synchronized, browsable, etc.

The reproduced source packets are received by a source depacketizer 4 and converted into a data stream (e.g., an MPEG-2 transport packet stream). A demultiplexer 5 demultiplexes the data stream into encoded data. An AV decoder 6 decodes the encoded data to produce the original data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 10 has been described as a recording and reproducing apparatus, it will be understood that only a recording or only a reproducing apparatus may be provided using those portions of FIG. 10 providing the recording or reproducing function.

As will be appreciated from the forgoing disclosure, the present invention provides a recording medium having a data structure for managing still images recorded on a high-density recording medium (e.g., a high-density optical disk such as a BD-ROM). For example, the data structure allows for displaying still images and possibly audio data in various ways.

The method of managing still images for a high-density recording medium in accordance with the invention provides various still control operations such as duration management and allows effective linked reproduction of still images along with associated subtitle data or graphic images.

As apparent from the above description, the present invention provides methods and apparatuses for recording a data structure on a high density recording medium for managing still images recorded on the recording medium.

The above description further provides methods and apparatus for reproducing still images recorded on a high density recording medium based on a data structure, also recorded on the high density recording medium, for managing the reproduction of still images.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. A non-transitory computer-readable medium having a data structure for managing reproduction of at least one still picture, comprising:
   a data area storing first and second stream files, the first stream file including presentation data, the second stream file including audio data, the presentation data being divided into at least one still picture unit, the at least one still picture unit including at least one still picture and associated graphic data, the at least one still picture unit not including the audio data, the still picture being reproduced as a slideshow, the audio data being reproduced with the slideshow; and a navigation area storing at least one playlist file and first and second clip information files, the at least one playlist file including at least one playitem and at least one sub-playitem, the at least one playitem indicating an in-point and an out-point of the first stream file for reproducing the presentation data, the at least one playitem further including duration information indicating whether to display at least one still picture for one of a finite and an infinite period of time, the at least one sub-playitem indicating an in-point and an out-point of the second stream file for reproducing the audio data, the first clip information file including a first entry point map, the first entry point map including at least one entry point mapping between a presentation time and a unit of the first stream file, the second clip information file including a second entry point map, the second entry point map including at least one entry point mapping between a presentation time and a unit of the second stream file, wherein the at least one still picture and associated graphic data in the still picture unit are reproduced synchronously based on the at least one playitem, wherein the audio data is reproduced independently from the at least one still picture unit and reproduced without interrupting reproduction of the still picture unit as the slideshow based on the at least one sub-playitem, wherein the stream files, the playlist file, and the clip information files are separate from each other and have different file extensions, wherein at least one of the first and second clip information files includes type information indicating that the audio data associated with the sub-playitem is for the slideshow.

2. The non-transitory computer-readable medium of claim 1, wherein the entry point of the first entry point map provides an address of the still picture.

3. The non-transitory computer-readable medium of claim 1, wherein the presentation data is multiplexed into a transport stream on a still picture unit basis.

4. The non-transitory computer-readable medium of claim 3, wherein each elementary stream of the presentation data are aligned within the still picture unit.

5. The non-transitory computer-readable medium of claim 4, wherein each elementary stream is a packetized elementary stream.

6. The non-transitory computer-readable medium of claim 5, wherein each still picture unit includes one packet from each packetized elementary stream.

7. The non-transitory computer-readable medium of claim 1, wherein the still picture is positioned in a first portion of each still picture unit.

8. The non-transitory computer-readable medium of claim 1, wherein the still picture unit includes a single still picture and the associated graphic data.

9. A method of recording a data structure for managing reproduction of at least one still picture on a recording medium, comprising:

recording first and second stream files, the first stream file including presentation data, the second stream file including audio data, the presentation data being divided into at least one still picture unit, the at least one still picture unit including at least one still picture and associated graphic data, the at least one still picture unit not including the audio data, the still picture being reproduced as a slideshow, the audio data being reproduced with the slideshow; and recording at least one playlist file and first and second clip information files, the at least one playlist file including at least one playitem and at least one sub-playitem, the at least one playitem indicating an in-point and an out-point of the first stream file for reproducing the presentation data, the at least one playitem further including duration information indicating whether to display at least one still picture for one of a finite and an infinite period of time, the at least one sub-playitem indicating an in-point and an out-point of the second stream file for reproducing the audio data, the first clip information file including a first entry point map, the first entry point map including at least one entry point mapping between a presentation time and a unit of the first stream file, the second clip information file including a second entry point map, the second entry point map including at least one entry point mapping between a presentation time and a unit of the second stream file, wherein the at least one still picture and associated graphic data in the still picture unit are reproduced synchronously based on the at least one playitem, wherein the audio data is reproduced independently from the at least one still picture unit and reproduced without interrupting reproduction of the still picture unit as the slideshow based on the at least one sub-playitem, wherein the stream files, the playlist file, and the clip information files are separate from each other and have different file extensions, wherein at least one of the first and second clip information files includes type information indicating that the audio data associated with the sub-playitem is for the slideshow.

10. The method of claim 9, wherein the presentation data is multiplexed into a transport stream on a still picture unit basis.

11. The method of claim 10, wherein each elementary stream of the presentation data are aligned within the still picture unit.

12. The method of claim 9, wherein the still picture is positioned in a first portion of each still picture unit.

13. The method of claim 9, wherein the still picture unit includes a single still picture and the associated graphic data.

14. A method of reproducing a data structure for managing reproduction of at least one still picture recorded on a recording medium, comprising:

reproducing first and second stream files, the first stream file including presentation data, the second stream file including audio data, the presentation data being divided into at least one still picture unit, the at least one still picture unit including at least one still picture and associated graphic data, the at least one still picture unit not including the audio data, the still picture being reproduced as a slideshow, the audio being reproduced with the slideshow; and reproducing at least one playlist file and first and second clip information files, the at least one playlist including at least one playitem and at least one sub-playitem, the at least one playitem indicating an in-point and an out-point of the first stream file for reproducing the presentation data, the at least one playitem further including duration information indicating whether to display at least one still picture for one of a finite and an infinite period of time, the at least one sub-playitem indicating an in-point and an out-point of the second stream file for reproducing the audio data, the first clip information file including a first entry point map, the first entry point map including at least one entry point mapping between a presentation time and a unit of the first stream file, the second clip information file including a second entry point map, the second entry point map including at least one entry point mapping between a presentation time and a unit of the second stream file, wherein the at least one still picture and associated graphic data in the still picture unit are reproduced synchronously based on the at least one playitem, wherein the audio data is reproduced independently from the at least one still picture unit and reproduced without interrupting reproduction of the still picture unit as the slideshow based on the at least one sub-playitem, wherein the stream files, the playlist file, and the clip information files are separate from each other and have different file extensions, wherein at least one of the first and second clip information files includes type information indicating that the audio data associated with the sub-playitem is for the slideshow.

15. The method of claim 14, wherein the presentation data is multiplexed into a transport stream on a still picture unit basis.

16. The method of claim 15, wherein each elementary stream of the presentation data are aligned within the still picture unit.

17. The method of claim 14, wherein the recording medium is a read-only recording medium.

18. The method of claim 14, wherein the recording medium is a recordable recording medium.

19. The method of claim 14, wherein the still picture is positioned in a first portion of each still picture unit.

20. The method of claim 14, wherein the still picture unit includes a single still picture and the associated graphic data.

21. An apparatus for recording a data structure for managing reproduction of at least one still picture on a recording medium, comprising:

a pick up configured to record data on the recording medium; and a controller configured to control the pick up to record first and second stream files, the first stream file including presentation data, the second stream file including audio data, the presentation data being divided into at least one still picture unit, the at least one still picture unit including at least one still picture and associated graphic data, the at least one still picture unit not including the audio data, the still picture being reproduced as a slideshow, the audio data being reproduced with the slideshow, and configured to control the pick up to record at least one playlist file and first and second clip information files, the at least one playlist file including at least one playitem and at least one sub-playitem, the at least one playitem indicating an in-point and an out-point of the first stream file for reproducing the presentation data, the at least one playitem further including duration information indicating whether to display at least one still picture for one of a finite and an infinite period of time, the at least one sub-playitem indicating an in-point and an out-point of the second stream file for reproducing the audio data, the first clip information file including a first entry point map, the first entry point map including at least one entry point mapping between a presentation time and a unit of the first stream file, the second clip information file including a second entry point map, the second entry point map including at least one entry point mapping between a presentation time and a unit of the second stream file, wherein the at least one still picture and associated graphic data in the still picture unit are reproduced synchronously based on the at least one playitem, wherein the audio data is reproduced independently from the at least one still picture unit and reproduced without interrupting reproduction of the still picture unit as the slideshow based on the sub-playitem, wherein the stream files, the playlist files and the clip information files are separate from each other and have different file extensions, wherein at least one of the first and second clip information files includes type information indicating that the audio data associated with the sub-playitem is for the slideshow.

22. The apparatus of claim 21, wherein the presentation data is multiplexed into a transport stream on a still picture unit basis.

23. The apparatus of claim 22, wherein each elementary stream of the presentation data are aligned within the still picture unit.

24. The apparatus of claim 21, further comprising:
an encoder configured to encode data;
a multiplexer configured to multiplex the encoded data to create a data stream; and
a source packetizer configured to packetize the data stream into source packets.

25. The apparatus of claim 21, wherein the still picture is positioned in a first portion of each still picture unit.

26. The apparatus of claim 21, wherein the still picture unit includes a single still picture and the associated graphic data.

27. An apparatus for reproducing a data structure for managing reproduction of at least one still picture recorded on a recording medium, comprising:

a pick up configured to reproduce data recorded on the recording medium; and a controller configured to control the pick up to reproduce first and second stream files, the first stream file including presentation data, the second stream file including audio data, the presentation data being divided into at least one still picture unit, the at least one still picture unit including at least one still picture and associated graphic data, the at least one still picture unit not including the audio data the still picture being reproduced as a slideshow, the audio data being reproduced with the slideshow, and configured to control the pick up to reproduce at least one playlist file, a first clip information file and a second clip information file, the at least one playlist file including at least one playitem and at least one sub-playitem, the at least one playitem indicating an in-point and an out-point of the first stream file for reproducing the presentation data, the at least one playitem further including duration information indicating whether to display at least one still picture for one of a finite and an infinite period of time, the at least one sub-playitem indicating an in-point and an out-point of second stream file for reproducing the audio data, the first clip information file including a first entry point map, the first entry point map including at least one entry point mapping between a presentation time and a unit of the first stream file, the second clip information file including a second entry point map, the second entry point map including at least one entry point mapping between a presentation time and a unit of the second stream file, wherein the at least one still picture and associated graphic data in the still picture unit are reproduced synchronously based on the at least one playitem, wherein the audio data is reproduced independently from at the least one still picture unit and reproduced without interrupting reproduction of the still picture unit as the slideshow based on the at least one sub-playitem, wherein the stream files, the playlist file, and the clip information files are separate from each other and have different file extensions, wherein at least one of the first and second clip information files includes type information indicating that the audio data associated with the sub-playitem is for the slideshow.

28. The apparatus of claim 27, wherein the presentation data is multiplexed into a transport stream on a still picture unit basis.

29. The apparatus of claim 28, wherein each elementary stream of the presentation data are aligned within the still picture unit.

30. The apparatus of claim 27, wherein the recording medium is a read-only recording medium.

31. The apparatus of claim 27, the recording medium is a recordable recording medium.

32. The apparatus of claim 27, further comprising:
a source depacketizer configured to depacketize source packets a data stream;
a demultiplexer configured to demultiplex the data stream into an encoded data; and
a decoder configured to decode the encoded data to original data to be displayed.

33. The apparatus of claim 27, wherein the still picture is positioned in a first portion of each still picture unit.

34. The apparatus of claim 27, wherein the still picture unit includes a single still picture and the associated graphic data.

35. An apparatus for reproducing a data structure for managing reproduction of at least one still picture recorded on a recording medium, comprising:
a pick up configured to reproduce data recorded on the recording medium; and
a controller configured to control the pick up to reproduce first and second stream files, the first stream file including presentation data, the second stream file including audio data, the presentation data being divided into at least one still picture unit, the at least one still picture unit including at least one still picture and associated graphic data, the at least one still picture unit not including the audio data, the still picture being reproduced as a slideshow, the audio data being reproduced with the slideshow, and configured to control the pick up to reproduce at least one playlist file and first and second clip information files, the at least one playlist file including at least one playitem and at least one sub-playitem, the at least one playitem indicating an in-point and an out-point of the first stream file for reproducing the presentation data, the at least one sub-playitem indicating an in-point and an out-point of the second stream file for reproducing the audio data, the first clip information file including a first entry point map, the first entry point map including at least one entry point mapping between a presentation time and a unit of the first stream file, the second clip information file including a second entry point map, the second entry point map including at least one entry point mapping between a presentation time and a unit of the second stream file, wherein the at least one still picture and associated graphic data in the still picture unit are reproduced synchronously based on the at least one playitem, wherein the audio data is reproduced independently from the at least one still picture unit and reproduced without interrupting reproduction of the still picture unit as the slideshow based on the at least one sub-playitem, wherein the stream files, the playlist file, and the clip information files are separate from each other and have different file extensions, wherein at least one of the first and second clip information files includes type information indicating that the audio data associated with the sub-playitem is for the slideshow.

36. The apparatus of claim 35, further comprising;
a source depacketizer configured to depacketize source packets into a data stream;
a demultiplexer configured to demultiplex the data stream into an encoded data; and
a decoder configured to decode the encoded data to an original data to be displayed.

37. The apparatus of claim 35, wherein the still picture is positioned in a first portion of each still picture unit.

38. The apparatus of claim 35, wherein the still picture unit includes a single still picture and the associated graphic data.

* * * * *